June 21, 1949.  R. REID  2,473,905
AUTOMATIC CONTROL SYSTEM
Filed July 12, 1946  2 Sheets-Sheet 2

Inventor
R. Reid
By Stewart Downing Techely
Attys.

Patented June 21, 1949

2,473,905

UNITED STATES PATENT OFFICE 2,473,905

AUTOMATIC CONTROL SYSTEM

Ronald Reid, Irlam, England

Application July 12, 1946, Serial No. 683,262
In Great Britain July 31, 1945

7 Claims. (Cl. 236—78)

This invention relates to automatically acting electrically operated control systems.

It is an object of the invention to provide means whereby fluctuations in any desired quantity, e. g. in a temperature or a pressure, from a predetermined magnitude, are automatically corrected.

A further object of the invention is to provide an electrically operated control system of this kind, which is highly sensitive, cheap by comparison with ordinary hydraulic servo-mechanisms, and does not necessitate the use of switching contacts in the control system.

In the control system according to the invention, any fluctuation from the predetermined magnitude, in either direction, produces a potential difference which is utilised to effect a readjustment to the desired value.

In accordance with one feature of the invention, the potential difference due to a fluctuation from the predetermined magnitude, amplified if necessary, is used to actuate a thyratron or gas-filled relay valve, the response of which actuates means for restoring the predetermined value.

Although not restricted thereto, the invention is particularly useful for temperature control of furnaces, in which case a thermo-couple or other suitable device may be used for obtaining a potential corresponding to the temperature in the furnace, and the readjustment of the temperature after a fluctuation may be effected by varying the fuel supply of the furnace.

In the application of the invention to the control of pressure, use may be made of a device including a quartz plate adapted to be flexed by change of pressure and to produce a potential difference, by which means very small fluctuations in pressure can be corrected.

It will be readily realized that the invention can be used to control any quantity, if fluctuations in the quantity can be made to produce corresponding differences in an electromotive force.

Referring to the accompanying explanatory drawing.

Figure 1:
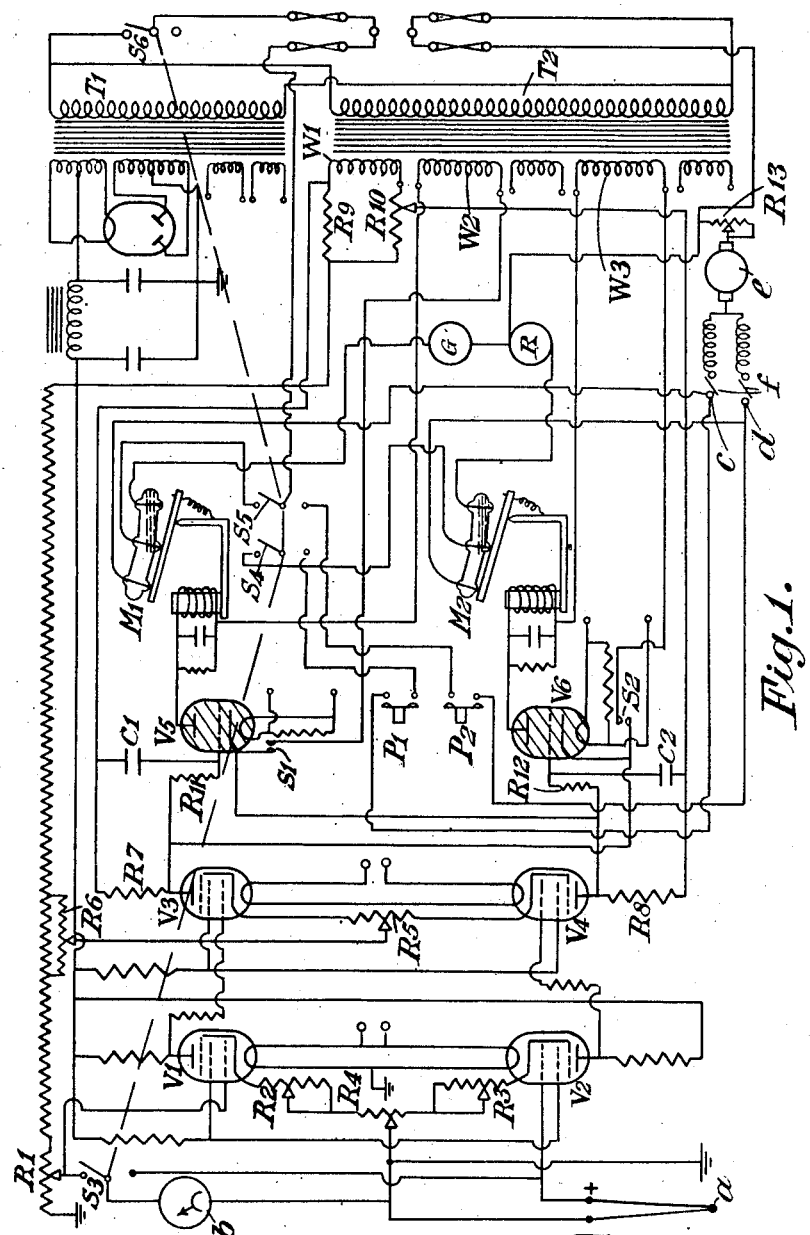
Figure 1 shows a circuit diagram of an arrangement according to the invention for controlling the temperature of a furnace.

$a$ is a thermocouple located in the furnace, having one side earthed and the other connected to the control grid of a pentode valve $V_2$. $R_1$ is a potentiometer, also earthed at one end and having its tapping connected to the control grid of a pentode valve $V_1$ connected in push-pull with $V_2$. The milli-volt meter $b$ connected across the potentiometer enables the voltage tapped off to be adjusted to equal the output of the thermocouple corresponding to the desired furnace temperature. Potentiometers $R_2$, $R_3$ connected between the cathodes of the valves are used for balancing the amplifying valves $V_1$, $V_2$, and the potentiometer $R_4$ gives the final adjustment and also serves for coarse adjustment to correct temperature drift.

The valves $V_1$, $V_2$ are resistance-coupled to a second pair of pentodes $V_3$, $V_4$ also connected in push-pull, with a potentiometer $R_5$ between the cathodes for fine adjustment to correct temperature drift, the tapping thereof being taken to the potentiometer $R_6$ to obtain correct bias for valves $V_3$, $V_4$.

High tension supplies for the screens and anodes of the pentodes $V_1$—$V_4$ are obtained from a transformer $T_1$ with associated rectifier and smoothing circuit. The screens of $V_1$—$V_4$ and the anodes of $V_1$, $V_2$ are supplied through suitable resistance in the normal manner. The anode of $V_3$ is supplied through an anode resistance $R_7$, and a further resistance $R_9$, in series with $R_7$ and the anode of $V_4$ is supplied through an anode resistance $R_8$ and the tapping of a potentiometer $R_{10}$ connected to the high tension voltage supply and, through a secondary winding $W_1$ of the transformer $T_2$, to the junction of $R_7$ and $R_9$. The potentiometer $R_{10}$ is used for controlling sensitivity by adjusting the critical A. C. bias on the thyratrons.

The anodes of the valves $V_3$, $V_4$ are connected through resistances $R_{11}$, $R_{12}$ to the grids of the thyratrons $V_5$, $V_6$ respectively, condensers $C_1$, $C_2$ being across the resistances $R_7$, $R_{11}$ and $R_8$, $R_{12}$ respectively. In addition, the anode of $V_3$ is connected directly to the cathode of $V_6$ and the anode of $V_4$ is connected directly to the cathode of $V_5$. The anode-cathode circuits of the thyratrons are fed with alternating current in phase opposition from secondary windings $W_2$, $W_3$ of the transformer $T_2$. Thermal delay switches $S_1$, $S_2$ are provided in the anode-cathode circuits, which are arranged to close only after the cathode heaters of the thyratrons have become effective.

In the anode circuits of the thyratrons are relays controlling mercury switches $M_1$, $M_2$, each of which has a center contact connected to an A. C. supply, a right-hand contact connected to a lamp G or R and a left-hand contact connected to a terminal $c$ or $d$ of a reversible motor $e$ for actuating the fuel valve of the furnace, the other terminals of the lamps and motor being connected to the other side of the A. C. supply. In the normal position, the left-hand contacts are disconnected, and the center and right-hand contacts are connected together, so that the motor is out of circuit, but both lamps are in circuit.

When the temperature of the furnace has the desired value, the voltages applied to the control grids of $V_1$ and $V_2$ are equal, and hence the anode currents of these valves are equal, as are those of $V_3$ and $V_4$. The thyratrons remain extinguished and the lamps G and R are lit.

When the furnace temperature varies, the control grid voltages of $V_1$ and $V_2$ are no longer equal, and therefore the anode currents in these valves and those in $V_3$ and $V_4$ become unequal. For example, when the temperature falls, the thermocouple voltage falls, the anode current in $V_2$ is reduced and that in $V_4$ rises, and the bias voltages applied to the thyratrons are varied in such a manner that $V_5$ fires. The relay actuating the mercury switch $M_1$ then responds and the switch closes the circuit to the contact $c$ of the motor $e$ which then runs in the appropriate direction to open the fuel valve of the furnace. At the same time the lamp G is extinguished. If, on the other hand, the temperature of the furnace rises, the thyratron $V_6$ will fire and the mercury switch $M_2$ will close the circuit to the contact $d$ of the motor $e$, which will then run in the reverse direction to close the fuel valve, the lamp R being extinguished. Limit switches indicated at $f$ are provided in association with the fuel valve to stop the motor when the valve reaches its fully open or fully closed position. A variable resistance $R_{13}$ serves for controlling the speed of the motor.

Four double-throw switches $S_3$, $S_4$, $S_5$, $S_6$, ganged together are provided, which are closed in the upper position for the automatic operation of the equipment. When open they cut the equipment out altogether, and when closed in the lower position, $S_3$ connects the meter $b$, which is preferably graduated with a scale of temperature, across the thermocouple $a$ to give a visual indication of the furnace temperature, $S_4$ and $S_5$ connect the A. C. supply to the push button contacts $P_1$, $P_2$ instead of the center contacts of the mercury switches, and $S_6$ disconnects the A. C. supply to the transformer $T_1$ thereby cutting off the supply to the amplifying valves $V_1$—$V_4$. The equipment can then be used for manual control of the furnace temperature in accordance with the readings of the meter $b$, since when the push button $P_1$ is pressed it closes the circuit to the motor terminal $c$ for opening the fuel valve, and $P_2$ closes the circuit to the terminal $d$ for closing the valve.

Heater current for the valves is provided in the usual manner by windings on the transformers $T_1$, $T_2$, the connections for this purpose being omitted from the drawing.

Figure 2:
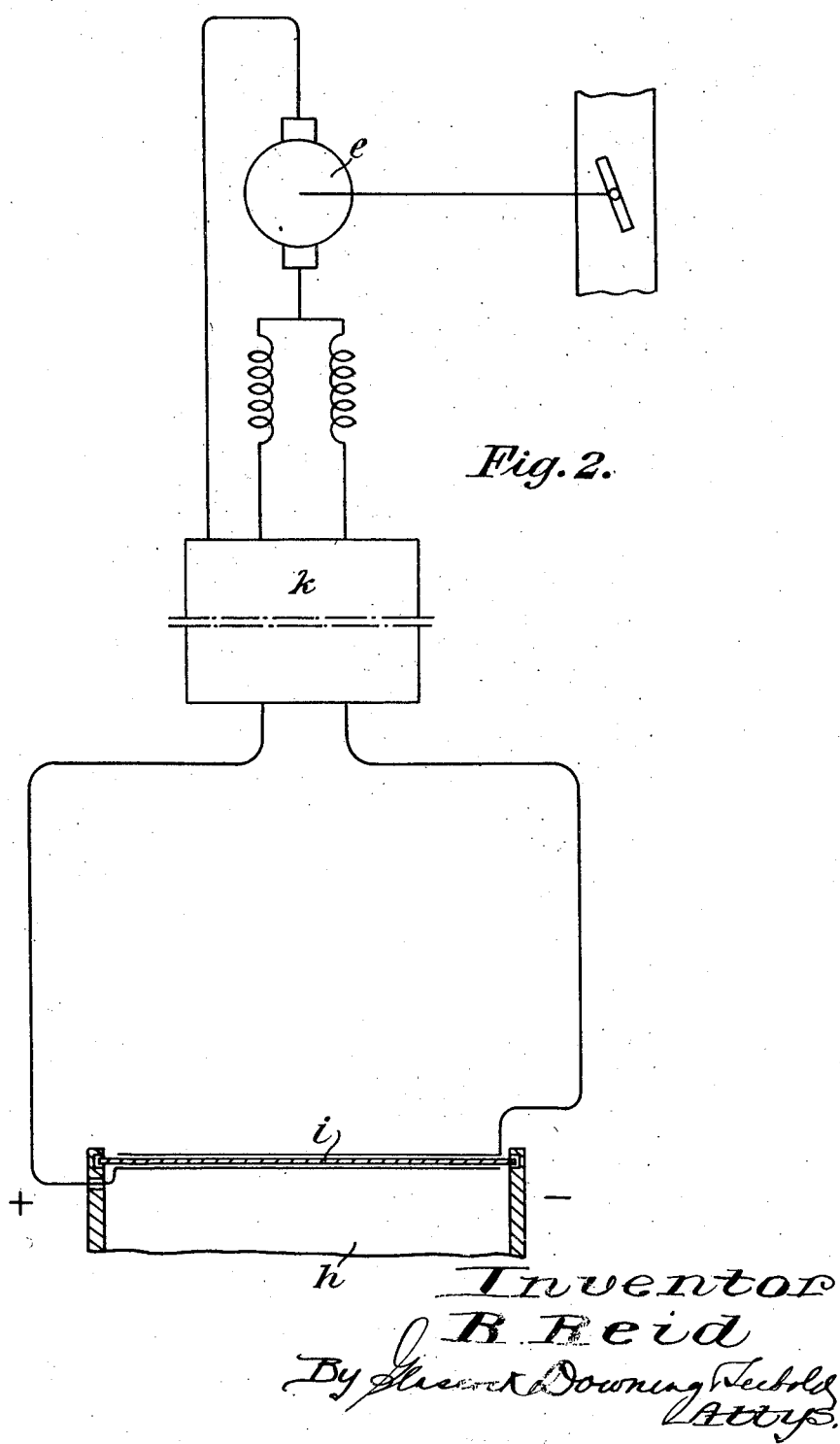
Figure 2 shows diagrammatically a device for controlling pressure.

Figure 2 show a method of applying the invention to controlling pressures. $h$ is a pressure-sensitive device, the essential part of which is a quartz plate $i$ adapted to be flexed by changes in pressure and thereby to produce an E. M. F., which is then applied to an amplifier and thyratron system $k$, as described above, the device $h$ replacing the thermocouple $a$ in Figure 1. The output is applied to a reversible motor $e$ as described above, which actuates a valve in a conduit for leading gas into or out of the space where the pressure is required to be kept constant, for example a stack damper of a furnace.

In some applications of the device it might be advantageous if the potentiometer $R_1$ were connected across a separate constant voltage source instead of being connected to the high tension voltage supply through a bleeder resistance as shown in Figure 1.

What I claim is:

1. An automatically acting electrically operated system for controlling temperatures, pressures and so forth, comprising means for generating an electro-motive force corresponding to the value of the quantity to be controlled, means for providing a constant electro-motive force equal to that corresponding to the desired value of the quantity to be controlled, a pair of thermionic valves connected in push-pull, the said electromotive forces being applied respectively to the control grids of the valves, a pair of thyratrons, the anode of one valve being connected to the control grid of one thyratron and to the cathode of the other thyratron, while the anode of the other valve is connected to the control grid of the other thyratron and to the cathode of the one thyratron, means for feeding the anode-cathode circuits of the thyratrons with alternating current in phase opposition, and means controlled by the thyratrons for influencing the value of the quantity to be controlled in one direction when one thyratron responds, and in the other direction when the other thyratron responds, to a fluctuation in the value of the quantity to be controlled.

2. A system as claimed in claim 1, having the anodes of the thermionic valves connected through resistances to opposite poles of a source of alternating current and also through further resistances to a source of continuous current.

3. A system as claimed in claim 1 and having a push-pull amplifier interposed before the pair of thermionic valves.

4. An automatically acting electrically operated system for controlling temperatures, pressures and so forth, comprising means for generating an electro-motive force corresponding to the value of the quantity to be controlled, a potentiometer for providing a constant electro-motive force corresponding to the desired value of the quantity to be controlled, a pair of thyratrons, a push-pull amplifier including input and output valves having said electro-motive forces applied to the control grids of the input valves, and each of the output valves having its anode resistance-coupled to the grid of one of the thyratrons and directly connected to the cathode of the other thyratron, means whereby the anode-cathode circuits of the thyratrons are fed with alternating current in phase opposition, a reversible electric motor, relays in the anode circuits of the thyratrons for causing the motor to run in one direction when one thyratron responds and in the other direction when the other thyratron responds, and means driven by the motor for influencing the value of the quantity to be controlled in a direction corresponding to the direction of rotation of the motor, whereby when the electro-motive force corresponding to the value of the quantity to be controlled varies from the desired value, one of the thyratrons responds and the motor runs in the direction to correct the variation.

5. A system as claimed in claim 1, in which, for controlling the temperature of a furnace, a thermocouple provides a voltage corresponding to the temperature and the response of a thyratron actuates means for adjusting the fuel supply to correct the fluctuation in temperature.

6. A system as claimed in claim 4, for controlling the temperature of a furnace having a fuel valve, in which a thermocouple is used to provide a voltage corresponding to the temperature, and the reversible motor drives the fuel valve of the furnace.

7. A system as claimed in claim 1, in which a potential due to a change in pressure is obtained from a device including a quartz plate adapted to be flexed by the change in pressure.

R. REID.

REFERENCES CITED

The following references are of record in the file of this patent:

UNITED STATES PATENTS

| Number | Name | Date |
|---|---|---|
| 1,960,350 | Shackleton et al. | May 29, 1934 |
| 2,113,164 | Williams | Apr. 5, 1938 |
| 2,333,393 | Ryder | Nov. 2, 1943 |
| 2,376,599 | Jones | May 22, 1945 |